United States Patent
Hinds (10) Patent No.: US 11,622,236 B1
(45) Date of Patent: Apr. 4, 2023

(54) SYSTEM AND METHOD FOR RACE CONFIGURATION AND TRACKING

(71) Applicant: Charlie Hinds, Santa Rosa, CA (US)

(72) Inventor: Charlie Hinds, Santa Rosa, CA (US)

(*) Notice: Subject to any disclaimer, the term of this patent is extended or adjusted under 35 U.S.C. 154(b) by 0 days.

(21) Appl. No.: 17/590,194

(22) Filed: Feb. 1, 2022

(51) Int. Cl.
| | |
|---|---|
| *A63F 13/00* | (2014.01) |
| *H04W 4/029* | (2018.01) |
| *H04W 4/02* | (2018.01) |
| *H04W 4/20* | (2018.01) |
| *G07C 1/22* | (2006.01) |

(52) U.S. Cl.
CPC ............ *H04W 4/029* (2018.02); *H04W 4/023* (2013.01); *H04W 4/20* (2013.01); *G07C 1/22* (2013.01)

(58) Field of Classification Search
CPC ............. G07F 17/3262; A63B 2220/40; A63B 2220/803
See application file for complete search history.

(56) References Cited

U.S. PATENT DOCUMENTS

| | | | | |
|---|---|---|---|---|
| 2006/0259268 | A1* | 11/2006 | Vock | ............ G01P 1/16 342/357.57 |
| 2008/0109158 | A1* | 5/2008 | Huhtala | ............ A63B 24/0062 701/439 |
| 2009/0262088 | A1* | 10/2009 | Moll-Carrillo | ...... A61B 5/7475 345/173 |

\* cited by examiner

*Primary Examiner* — David L Lewis
*Assistant Examiner* — Eric M Thomas (57) ABSTRACT

A system includes linked hardware devices for tracking and managing races and race participants. The hardware device, which track position and motion, may be mounted on a vehicle of each participant of a race. A computing device, such as a mobile device, a laptop computer, or other processing device, may be coupled to the hardware device. Each computing device of each participant may link with each of the computing devices of each of the other participants to provide for a synchronized race view and information.

20 Claims, 11 Drawing Sheets

SYSTEM AND METHOD FOR RACE CONFIGURATION AND TRACKING

TECHNICAL FIELD

Aspects of the present disclosure relate to race management, and in particular, to race configuration and tracking using connected position tracking hardware.

BACKGROUND

Many types of racing exist including professional motorsports, biking, running, boating, sailing, etc. A race can include a starting position, a defined course, and a finish line. Same races include time trials in which racers attempt to run a fastest time on the defined course. Some races include multiple racers competing on a course at the same time to finish a certain distance, number of laps, or other metric for determining a winner of the race. Many forms of races include courses that are marked out by physical landmarks and winners are determined based on visually watching the finish line such as by a person or camera.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As described above, many different types of racing exist, however, there is no solution for timing and managing different race formats when the course does not consist of a formal race track. In particular, starting, timing, and determining the winner of a race for each format and type of races, whether for cars, boats, motorcycles, etc., may each require unique workarounds. For example, a race may be started using an air horn, a person standing between the vehicles with a flag or light, honking a horn, verbal signals, etc. Similarly, a finish line for a race may be marked by cones, a spray paint line, or other imprecise markers. Furthermore, races on water may be even more difficult to manage due to inability to easily physically mark starting lines and finish lines.

Aspects of the disclosure address the above-noted and other deficiencies by providing for a linked system of hardware devices for tracking and managing races and race participants. In some embodiments, a hardware device for tracking position and velocity may be mounted on a vehicle of each participant of the race. A computing device, such as a mobile device, a laptop computer, or other processing device, may be coupled to the hardware device, as described in more detail below. Additionally, each computing device of each participant may link with each of the computing devices of each of the other participants to provide for a synchronized race view and information.

Figure 1:
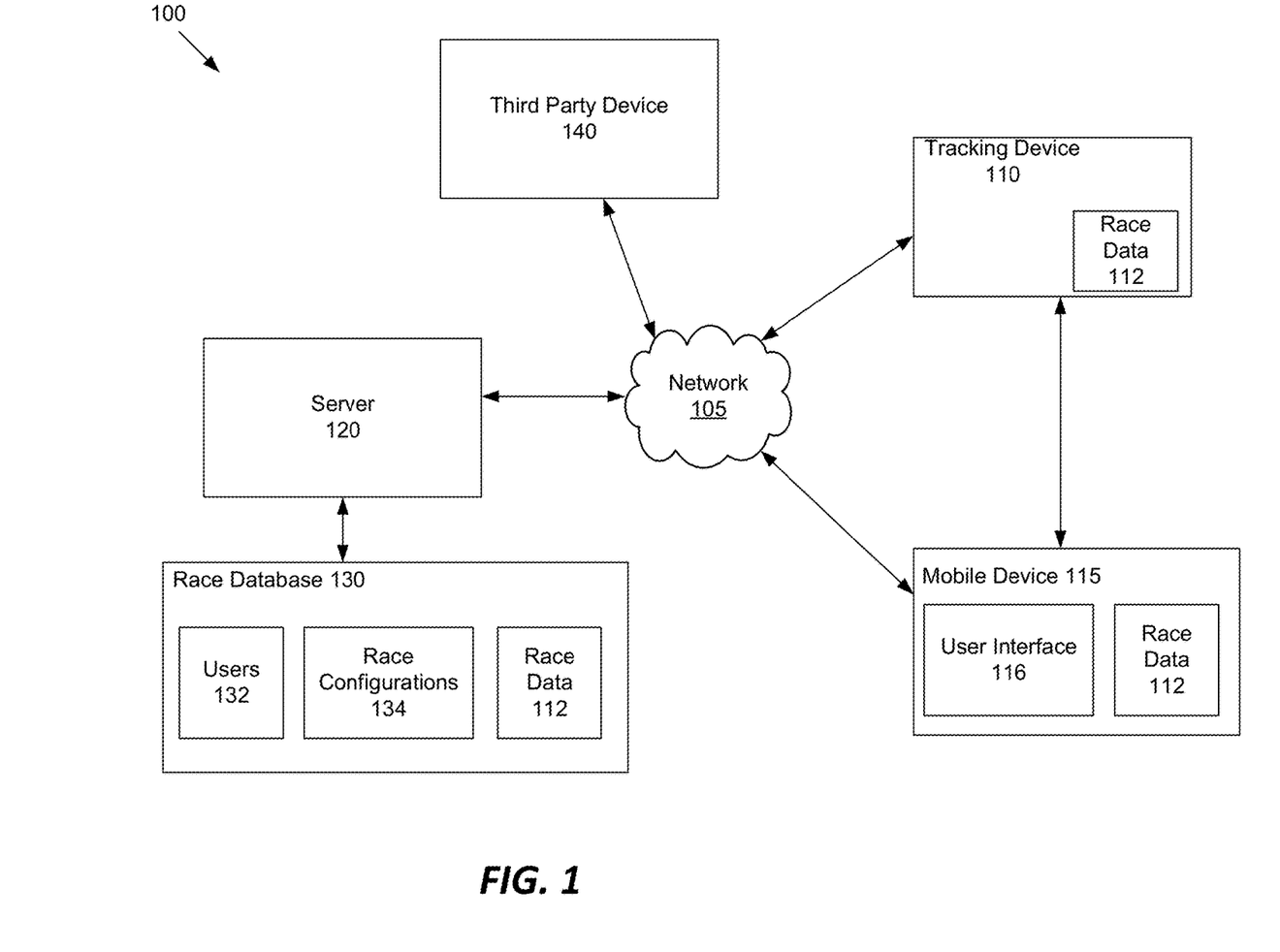
FIG. 1 is a system diagram illustrating a system for race configuration, monitoring, and tracking, according to some embodiments

FIG. 1 depicts a system 100 for race configuration, monitoring, and tracking, according to some embodiments. The system 100 may include one or more tracking devices 110, one or more mobile device 115, a server 120, a race database 130 and one or more third party devices 140 coupled via a network 105. Network 105 may be a public network (e.g., the internet), a private network (e.g., a local area network (LAN) or wide area network (WAN)), or a combination thereof. Server 120 may be any type of server, such as an application server, a web server, an FTP server, or any other type of server with which a user device can communicate. In some embodiments, tracking device 110 may be directly coupled to mobile device 115 via a local area network (LAN) using any form of short distance communication protocol (e.g., Bluetooth™, WiFi, or the like). For example, tracking device 110 may be mounted on a vehicle of a race participant. Tracking device 110 may include communication protocols for communicating with a mobile device of the participant and one or more other tracking devices 110 within a certain distance threshold of the tracking device 110. As described in more detail below, tracking device 110 may include GPS capabilities, inertial measurement capabilities, such as an accelerometer, and communication devices and/or protocols. The tracking device 110 may monitor race data 112 such as location, velocity, relative position, and any other information about the vehicle with respect to a race configuration. In some examples, the tracking device 110 may provide the race data 110 to the mobile device 115 of the race participant. The mobile device 115 may present the race data 112 to the participant via user interface 116. Examples of the user interface 116 are depicted in FIGS. 7-10. In some embodiments, the tracking device 110 and/or the mobile device 115 uploads the race data to server 120 which may store the race data 112 in a race database 130.

In some examples, a user may set up and configure a race via mobile device 115 or any computing device, such as a laptop computer. For example, the mobile device 115 may present a user interface 116 for configuring a race. The user interface 116 may provide prompts to the user for selecting a race type, distance, race participants, rules, or any other race information necessary to configure the type of race selected. In one example, the user may select or draw the course on a map interface. In another example, the user may select a course recording mode in which the user physically carries the mobile device 115, or the connected tracking device 110 over the course route while the mobile device 115 and/or the tracking device 110 records the route. In yet another example, previous race configurations 134 may be stored at the race database 130 which may be selected and used for race setup. For example, a course of a previous race configuration 134 may be selected and customized for a particular race and participants. Additionally, new race configurations and settings may be uploaded to the server 120 and stored at the race database 130 for future use and reference.

In some embodiments, upon selection or configuring of a race, participants can be notified (e.g., via their mobile devices) of the race, the race starting time, and the starting positions for the race. The tracking device 110 for each participant may provide the user (e.g., via the mobile device 115) an indication of when the vehicle is properly aligned (i.e., at the indicated starting position) to start the race. The tracking devices 110 may communicate to determine when each vehicle of the race participants are properly aligned. Once properly aligned, the tracking devices 110 and/or the mobile devices 115 may provide a countdown (audible and/or visual), a light tree, or any other indication of the start of the race. As described above, the tracking device 110 may monitor, record, and upload race data 112 during the race. In some embodiments, the tracking device 110 and/or the mobile device 115 may upload race data 112 in real time to the server 120 and database 130. Third party devices 140 of non-participants of the race may retrieve the race data 112 from the race database 130 via the server 120. For example, the race data 112 may be streamed to the third-party devices 140 upon request. Additionally, third-party devices 140 may upload pictures, videos, or other media associated with the race to the race database 130. Furthermore, dedicated cameras (e.g., action cameras such as GoPro™) may also upload video to the race database 130. For example, the race data 112 may include video or other media of the race that can be live streamed by third-party devices 140.

Figure 2:
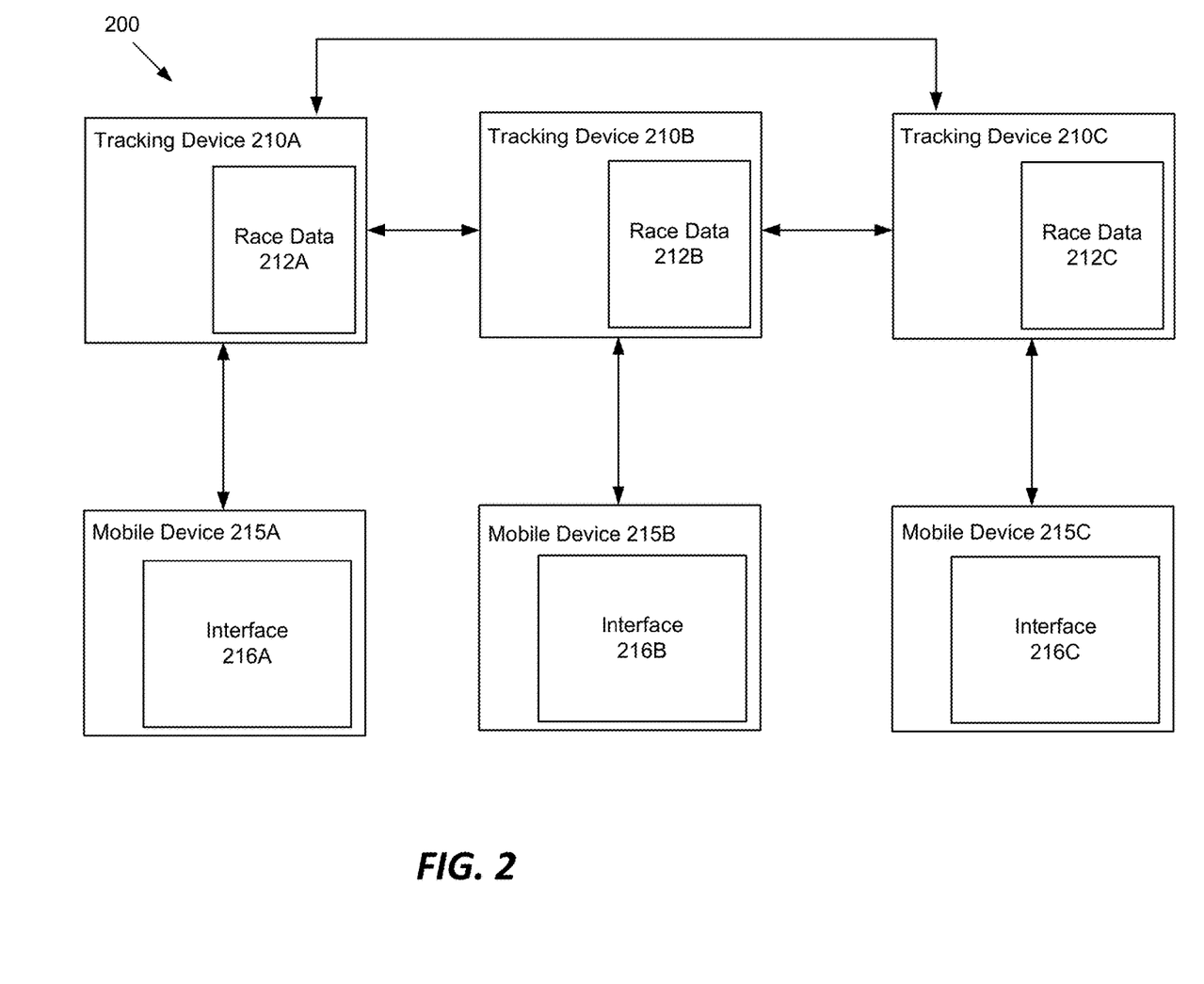
FIG. 2 is a system diagram that illustrates a system of interlinked tracking devices according to some embodiments.

FIG. 2 is a block diagram that illustrates a system 200 of interlinked tracking devices according to some embodiments. System 200 includes tracking devices 210A-C. Tracking devices 210A-C may be the same or similar to tracking device 110 of FIG. 1. Additionally, each tracking device has an associated mobile device 215A-C of the race participants. Although only three tracking devices and three corresponding mobile devices are depicted for ease of description, it should be noted that any number of tracking devices 210A-C may be linked in the system 200. Each tracking device 210A-C may collect race data 212A-C (e.g., location, velocity, acceleration, etc.) for the vehicle on which each tracking device 210A-C is mounted. Additionally, the tracking devices 210A-C may communicate race data 212A-C among one another as well as determine relative position between one another. Furthermore, in some examples, the tracking devices 210A-C may provide the race data 212A-C to the corresponding mobile devices 215A-C of the participants. The mobile devices 215A-C may present the race data 212A-C to the participant via an interface 216A-C. Example interfaces are presented in FIGS. 7-10.

Figure 3:
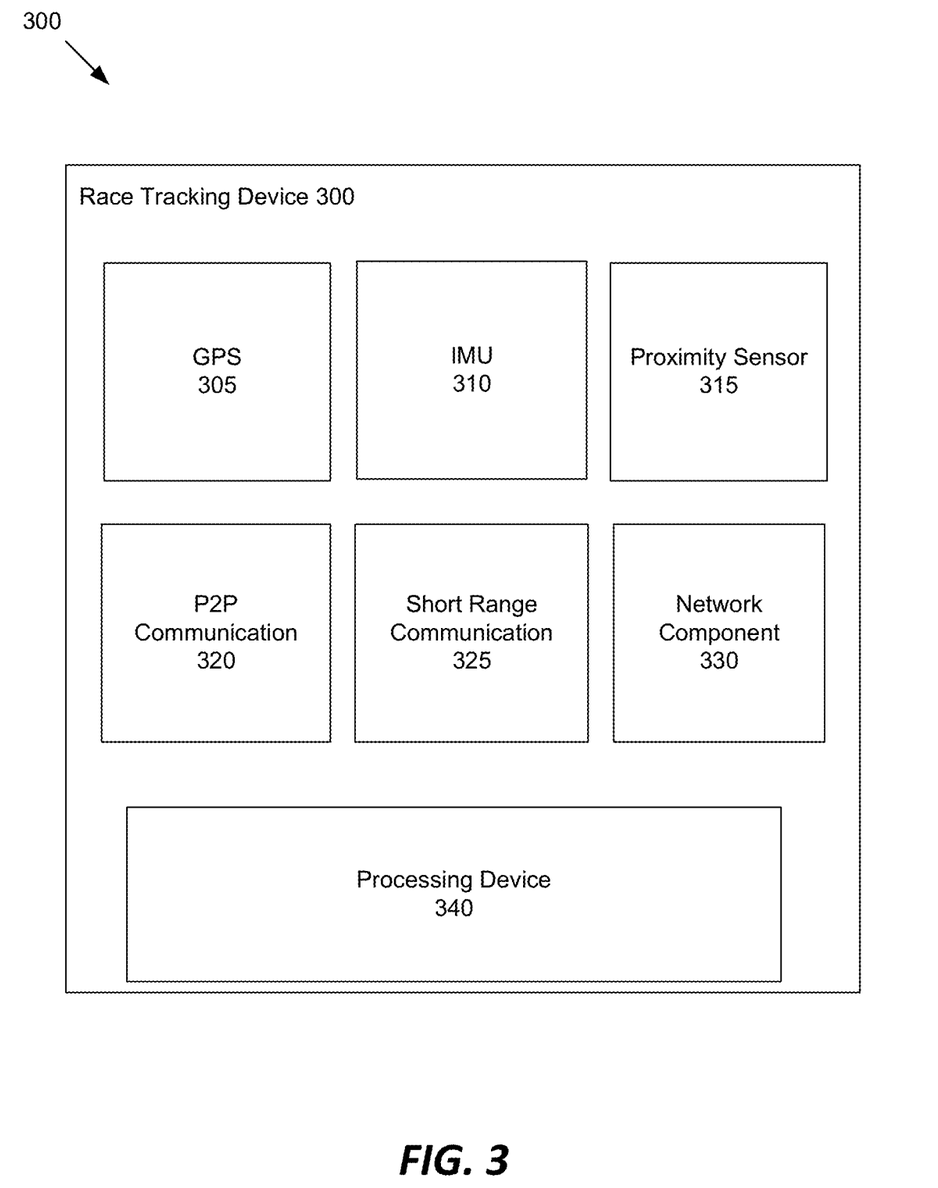
FIG. 3 is a block diagram that illustrates a race tracking device for monitoring and tracking a vehicle during a race, according to some embodiments

FIG. 3 is a block diagram that illustrates a race tracking device 300 for monitoring and tracking a vehicle during a race, according to some embodiments. Race tracking device 300 may include a global positioning system (GPS) device, an inertial measurement unit (IMU) 310, and a proximity sensor 315. The GPS device 305 may track an absolute location of the race tracking device 300 and the vehicle to which the race tracking device 300 is mounted. The GPS device 305 may also determine a speed and heading (e.g., velocity) of the vehicle. The IMU 310 may be, for example, an accelerometer to measure acceleration and changes in direction of the vehicle. The IMU 310 may further determine "G-force" (e.g., an amount of centrifugal force or inertial force felt in the vehicle) during acceleration and turning. Together, the GPS 305 and 310 IMU may collect racing performance statistics of the vehicle during a race. The proximity sensor 315 may detect proximity of other race tracking devices of vehicles in the race to the race tracking device 300. The proximity sensor 315 may be an ESPRESSIF SYSTEMS ESP32 Module, infrared (IR) sensor, passive infrared (PIR) Sensor, Radar, or any other peer to peer proximity or location sensor. In some embodiments, the GPS 305, the IMU 310, and the proximity sensor 315 may be used to determine results of a race (e.g., final race position, elapsed time, etc.).

In some examples, the race tracking device further includes a peer-to-peer (P2P) communication component 320, a short range communication component 325, and a network component 330. The P2P component 320 may be included in an ESPRESSIF™ SYSTEMS ESP32 Module. For example, an ESPRESSIF™ SYSTEMS ESP32 may include a feature called ESP-Now, for device communication. Once connected to a mobile device, the mobile device may be used for the racers to communicate via text or voice) The P2P component 320 may provide for communication between race tracking devices 300 in real time before and during a race to determine relative positioning and pass racing data between the race tracking devices. The short range communication component 325 may be BlueTooth™, WiFi™, ESP-Now or any other short range communication protocol. The short range communication component 325 may provide for communication between the race tracking device 300 and a computing device within the vehicle to display racing data (e.g., a mobile device of the race participant driving the vehicle to which the race tracking device 300 is mounted). The network component 330 may be a wireless network component (e.g., 5G, 4G, 3G wireless data) or WiFi™ device. The network component 330 may provide for direct upload of race data to a server and database from which the race data may be streamed, displayed, stored, monitored, etc.

Race tracking device 300 may include a processing device 340 to execute a race tracking component to collect the data produced by each of the hardware components of the race tracking device 300 and to generate cohesive racing data to be provided to a mobile device, server, etc. The processing device 340 may be a microcontroller, field programmable gate array (FPGA), central processing unit (CPU), graphics processing unit (GPU), or any other processing device.

Figure 4:
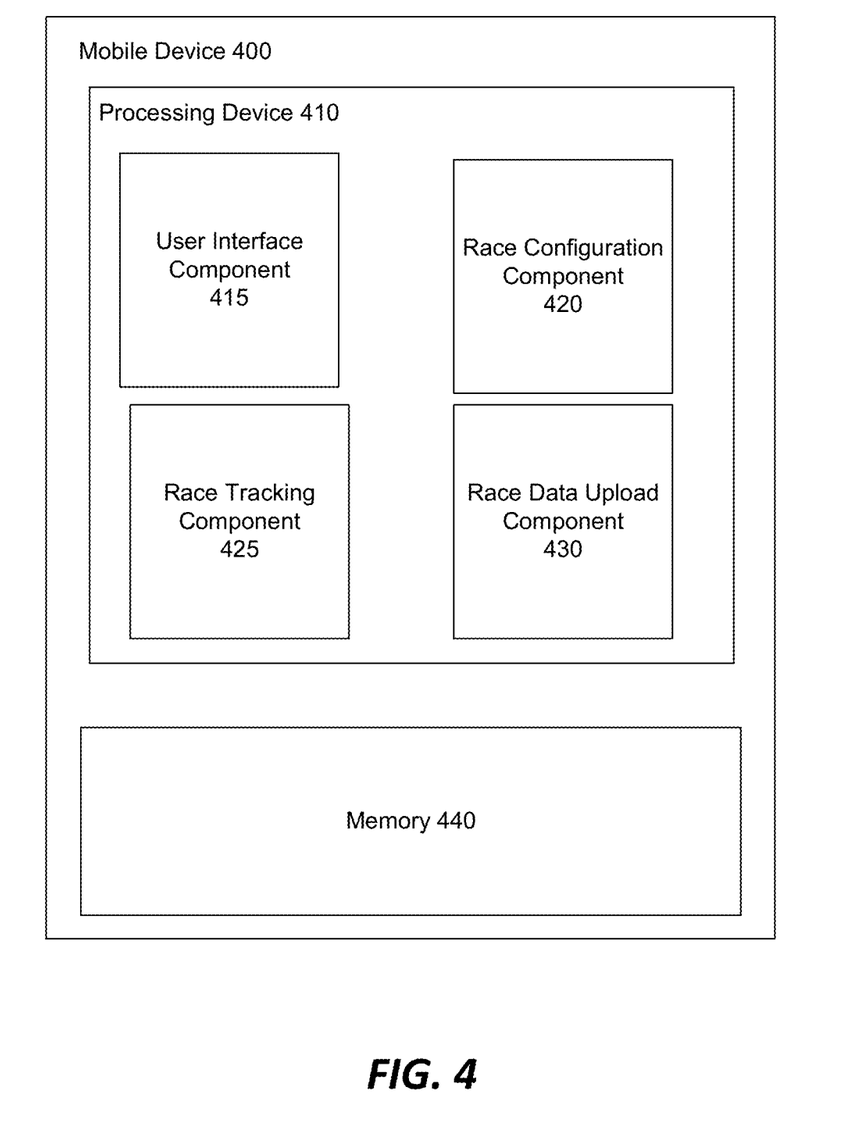
FIG. 4 is a block diagram that illustrates a computing device for management and display of race configurations and racing data, according to some embodiments

FIG. 4 is a block diagram that illustrates a computing device 400 for management and display of race configurations and racing data, according to some embodiments. Mobile device includes processing device 410 and memory 440. Memory 440 may include volatile memory devices (e.g., random access memory (RAM)), non-volatile memory devices (e.g., flash memory) and/or other types of memory devices The processing device 410 may include and execute a user interface component 415, race configuration component 420, race tracking component 425, and race data upload component 430. The user interface component 415 may provide a visual display of racing data collected from one or more race tracking devices (e.g., race tracking device 300 of FIG. 3). The user interface component 415 may also provide an interface for configuring races. The race configuration component 420 may present and generate race configurations based on input received from a user. For example, the race configuration component 420 may present options for a user to select a race type, race distance, race participants, and any other race rules or information. In some examples, the race configuration component 420 may provide an option to record a course by driving the course with the mobile device 400 and a race tracking device (e.g., device 300) mounted on the vehicle. In some examples, the race configuration component 420 may also provide an option to generate a tournament tree with race participants or to automatically generate a tournament tree based on the race participants.

The race tracking component 425 may receive racing data from the race tracking device. The race tracking component 425 may use the racing data to determine race positions, timing, etc. based on the configuration of the race. The race data upload component 430 may upload the racing data to a server and/or database for the race.

Figure 5:
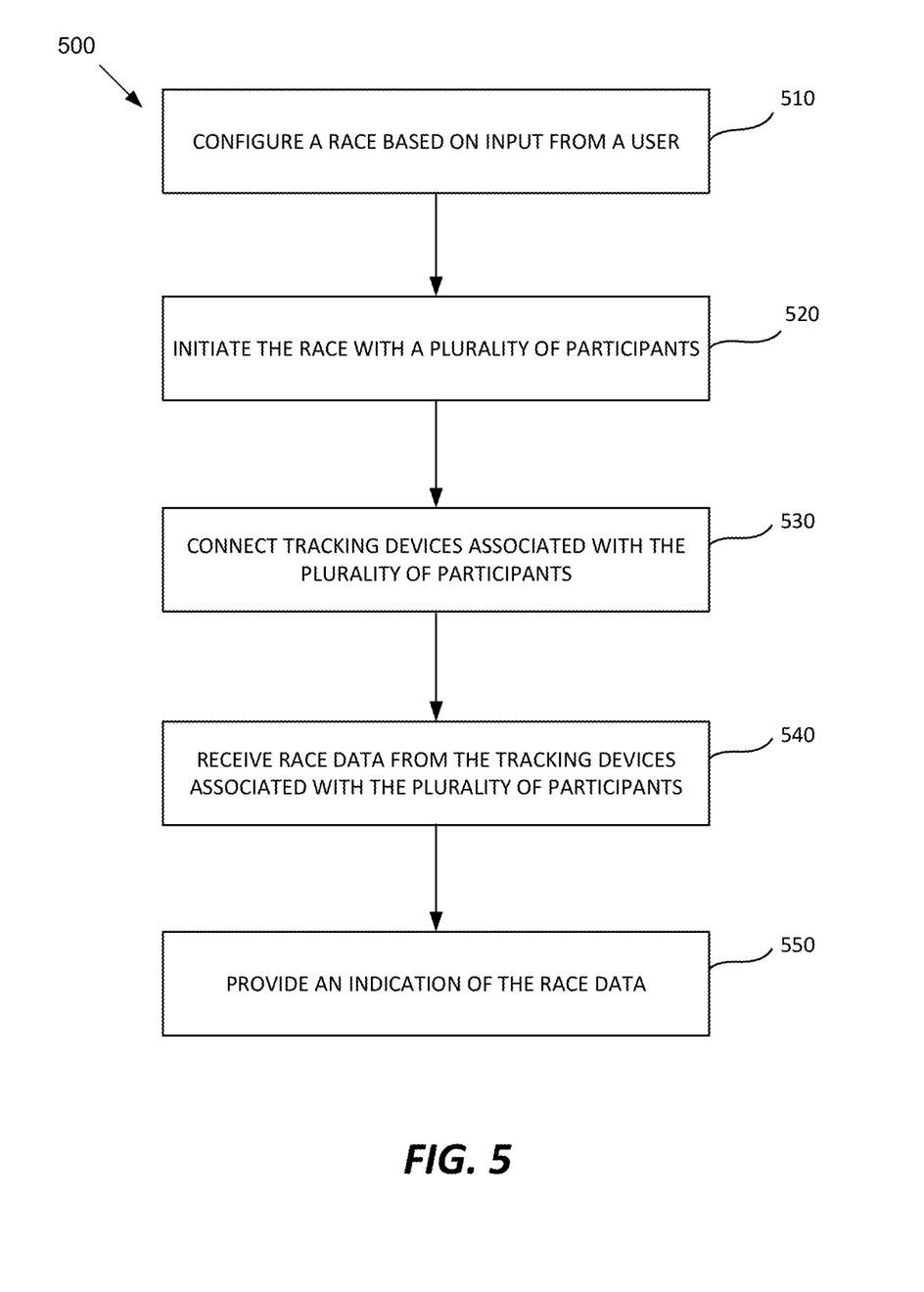
FIG. 5 is a flow diagram of a method of race configuration and tracking, in accordance with some embodiments.

FIG. 5 is a flow diagram of a method 500 of race configuration and tracking, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic configures a race based on input from a user. In some examples, the processing logic provides the configuration of the race to a web server to be stored and retrieved by race participant devices, observers, etc. In some examples, configuring the race may include moving at least one of the tracking devices along the intended race layout and recording the race layout as the at least one tracking device travels along the intended race layout. Alternatively, configuring the race may include moving a mobile device along the course to record the intended race layout.

At block 520, processing logic initiates the race with a plurality of participants. In some examples, the processing logic may determine if and when each of the tracking devices are properly aligned in a starting position according to the race configuration. At block 530, processing logic connects tracking devices associated with the plurality of participants. For example, the tracking devices may communicate via a peer-to-peer communication path to exchange race data and location information.

At block 540, processing logic receives race data from the tracking devices associated with the plurality of participants. In some examples, the processing logic also determines results of the race based on a configuration of the race and the race data from the tracking devices. The processing logic may also provide the race data to the web server storing the race configuration. The race data may be associated with the race configuration and the user from which the race data was uploaded. The race data may include a location of the tracking devices with respect to a race layout, a relative position of each of the plurality of devices in the race with respect to the race layout, a speed of the plurality of devices, timing of the race, an amount of the race remaining, or any other race information and statistics. At block 550, processing logic provides an indication of the race data. For example, the processing logic may provide the race data via a graphical user interface (GUI), such as one or more of the GUIs depicted in FIGS. 7-10.

Figure 6:
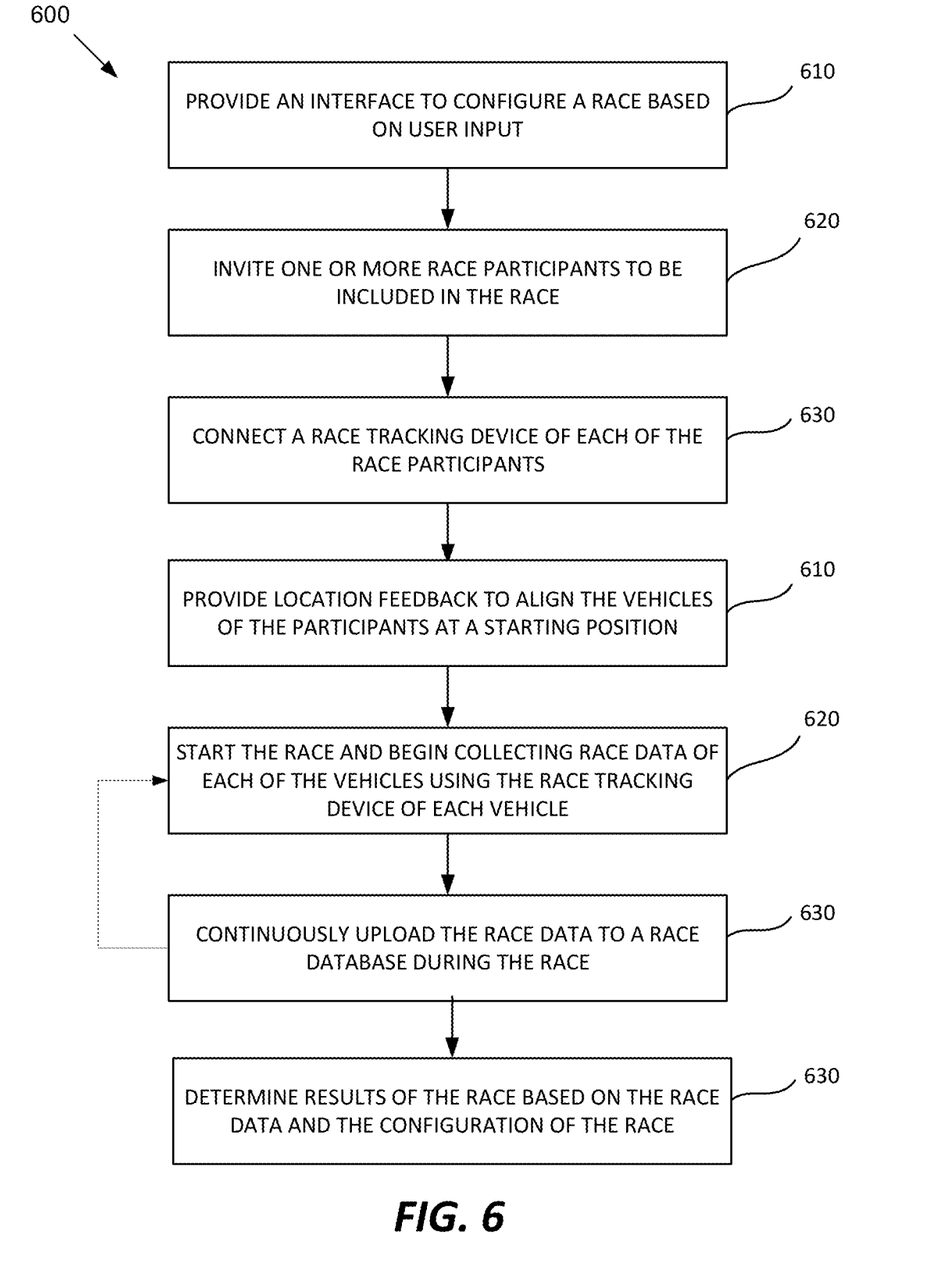
FIG. 6 is a flow diagram of a method of race configuration, management, and tracking, in accordance with some embodiments.

FIG. 6 is a flow diagram of a method 600 of race configuration, management, and tracking, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 602, where the processing logic provides an interface and configures a race based on user input. The interface may provide the user with options for selecting a race type, distance, number of laps, number of participants, etc. The interface may additionally provide options for manual entry of race configurations. In some examples, the user may select from previous race configurations as well as add on custom details to previous race configurations.

At block 604, the processing logic invites one or more race participants to be included in the race. In some examples, a notification of the race may be provided to a computing device (e.g., a smartphone) of a requested participant. In some examples, users may request to participate in the race and the designer or owner of the race may approve and accept one or more of the requesting users.

At block 606, the processing logic connects a race tracking device of each of the race participants. In some examples, each of the race tracking devices may be mounted on a vehicle of a participant and may communicate with a mobile device of the participant. In some examples, the race tracking devices of the participants may be linked together and may communicate race data among one another before, during, and after the race. In some examples, the race tracking devices may be aware of the location of each of the other race tracking devices (e.g., via communications, proximity sensors, etc.).

At block 608, the processing logic provides location feedback to align the vehicles of the participants at a starting position. In some examples, to start a race each of the vehicles of the race participants must be aligned according to the race configuration. For example, each vehicle must be aligned at a starting line, a starting position, a starting speed, etc. In some examples, the processing logic may determine starting positions based on known attributes of vehicles. For example, if the race is a drag race and one vehicle has a performance advantage, the vehicle with the advantage may have a starting position somewhere behind the other vehicle.

Any starting position or type may be accounted for by the race configuration and the alignment of the vehicles using the race tracking devices.

At block 610, the processing logic starts the race and begins collecting race data/statistics of each of the vehicles using the race tracking device of each vehicle. For example, as described above a race position, timing, lap number, location on the track or any other race data or vehicle performance statistics may be collected. At block 612, the processing logic continuously uploads the race data to a race database during the race. The race database may store race configurations, users/participants associated with the race, previous race data for the race configuration (such as best lap times or other performance benchmarks).

At block 614, the processing logic determines results of the race based on the race data and the configuration of the race. For example, the race data may indicate a race position of each of the vehicles at the end of the race, an order for which the vehicles finished the race, lap time data, performance highlights (e.g., best lap, top speed, average speed, etc.) and any other race results desired by each of the participants.

Figure 7:
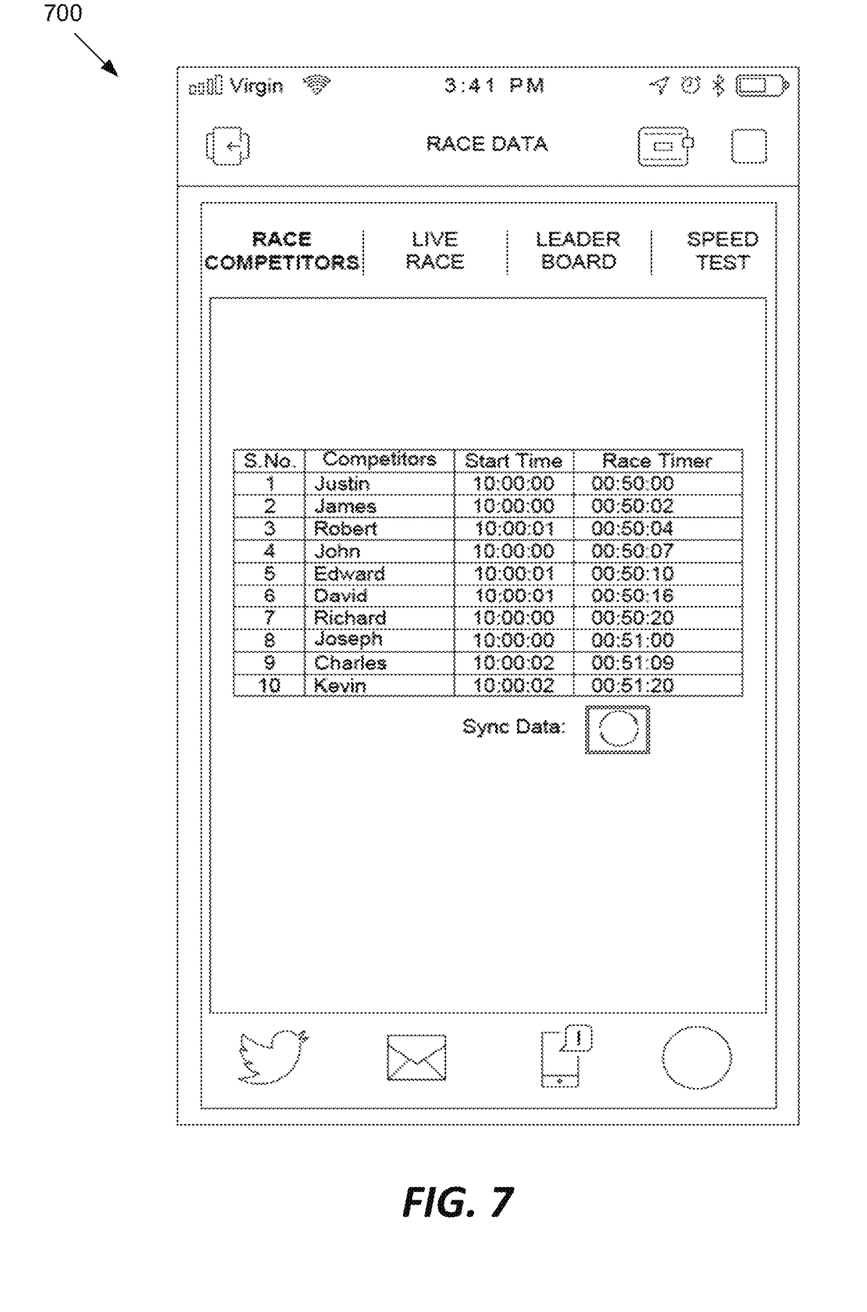
FIG. 7 illustrates an example graphical user interface of a computing device according to some embodiments.

FIG. 7 depicts a graphical user interface 700 of a computing device according to some embodiments. GUI 700 presents a list of race participants including start times and a race timer for each of the participants. The data presented in the GUI 700 may be updated in real time from a race tracking device (e.g., race tracking device 300).

Figure 8:
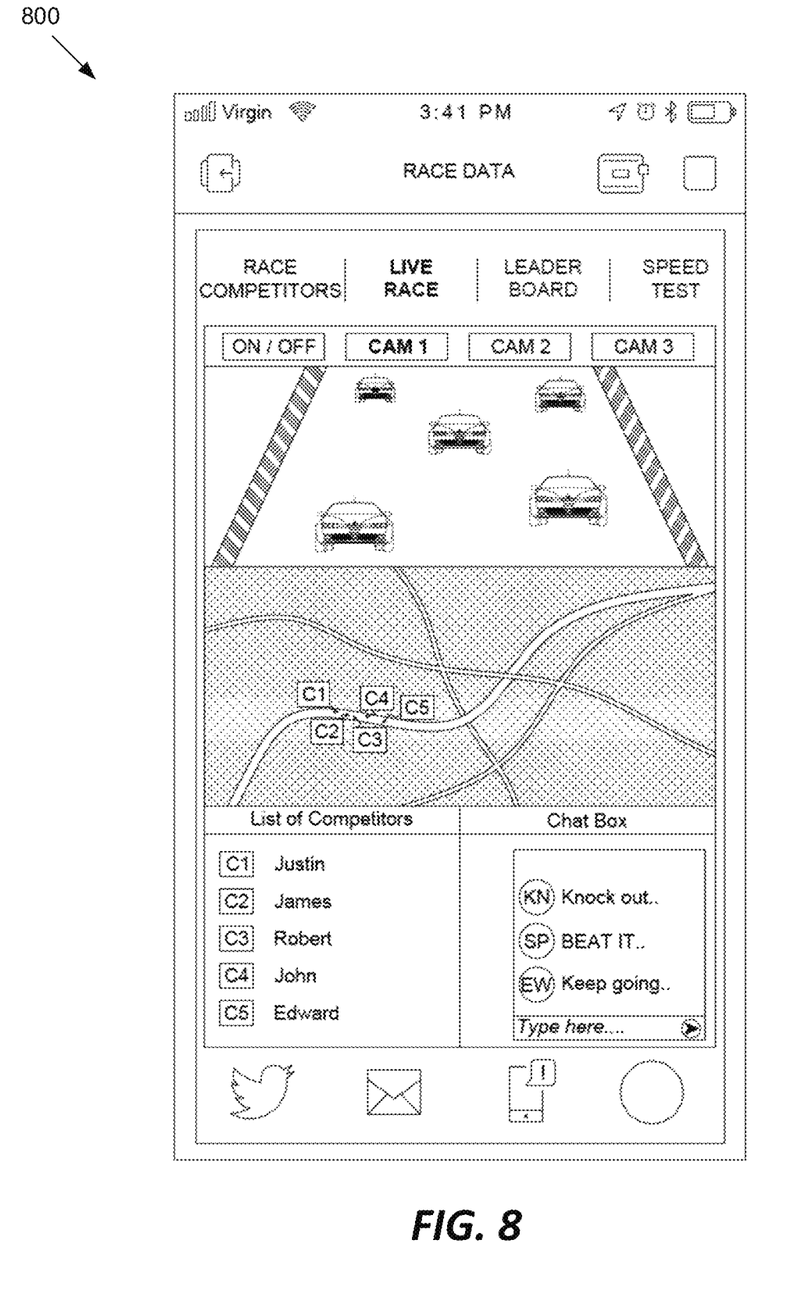
FIG. 8 illustrates an example graphical user interface of a computing device according to some embodiments.

FIG. 8 depicts another example GUI 800 of a computing device according to some embodiments. GUI 800 presents camera views of the participants of the race and a map view including the locations and positions of each participant of the race. In some examples, the GUI 800 may also provide camera options with different views of the race, a social aspect such as a chat box, and a list of competitors of the race.

Figure 9:
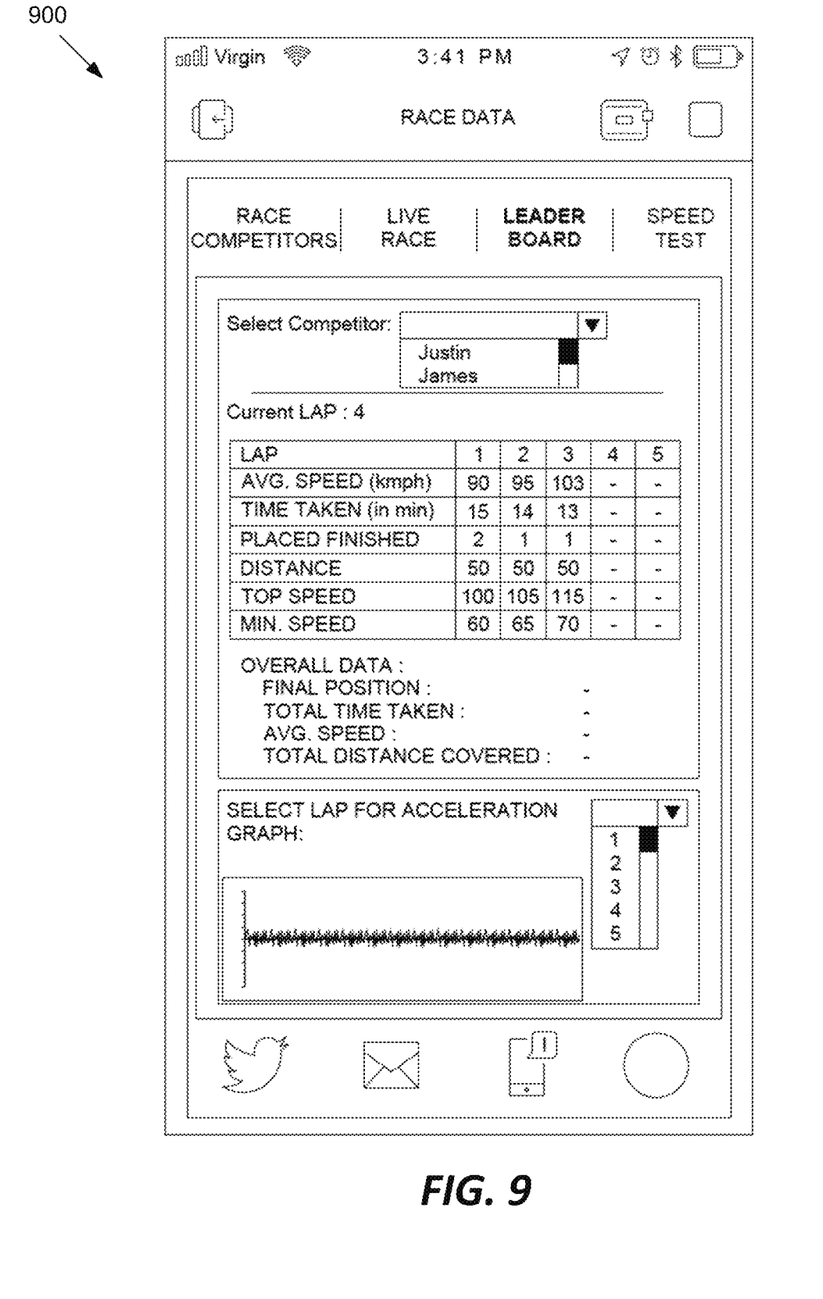
FIG. 9 illustrates an example graphical user interface of a computing device according to some embodiments.

FIG. 9 depicts another example GUI 900 of a computing device according to some embodiments. GUI 900 presents a leader board view of the race with several race metrics. For example, GUI 900 includes an option to select a competitor to view metrics such as average speed, elapsed time, place finished, distance, top speed, minimum speed, etc. for each lap and/or overall race. In some examples, the GUI 900 may include an acceleration graph for each lap or other metric graph.

Figure 10:
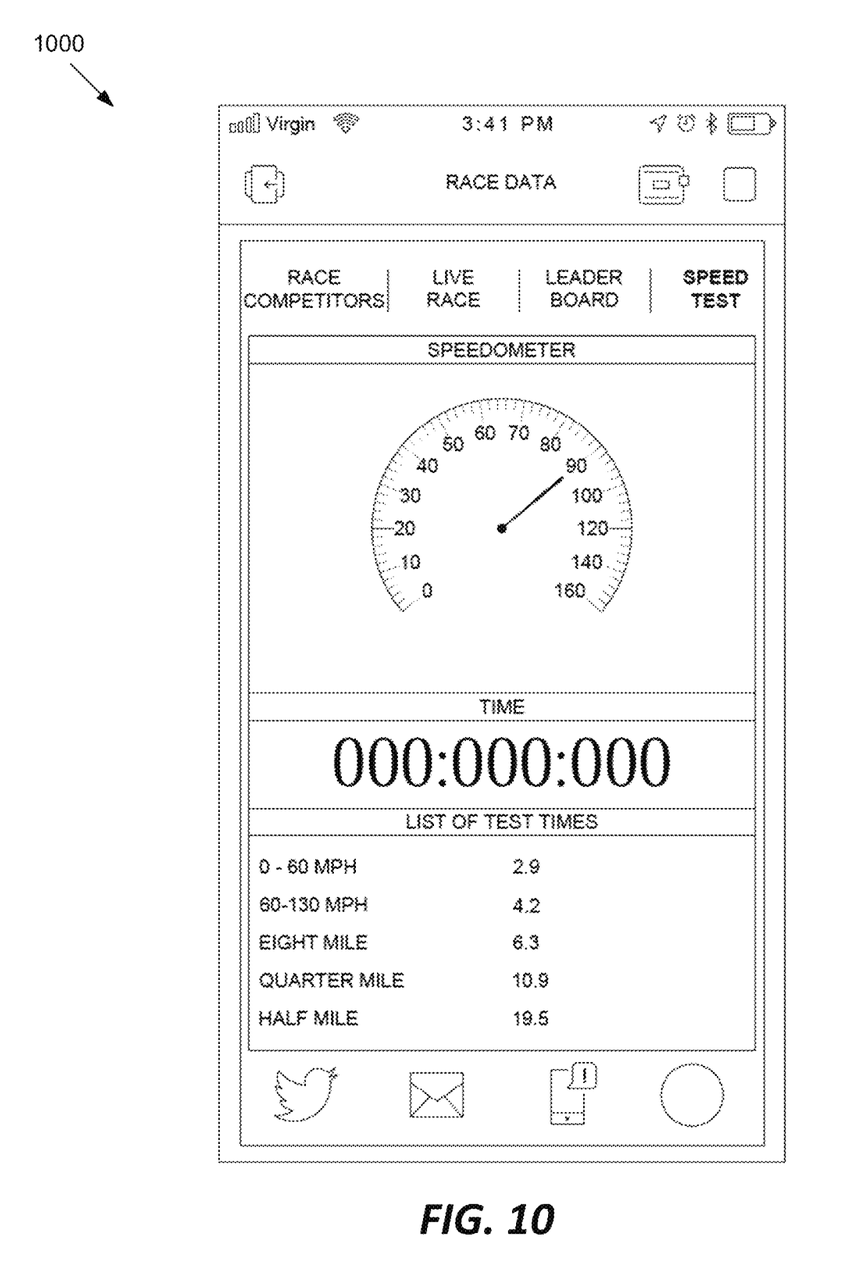
FIG. 10 illustrates an example graphical user interface of a computing device according to some embodiments.

FIG. 10 depicts another example GUI 1000 of a computing device according to some embodiments. GUI 1000 presents a speedometer and timer with one or more speed and performance metrics (e.g., 0-60 mph, 60-130 mph, eighth mile time, quarter mile time, half mile time, etc.). The speedometer may be depicted as an analog speedometer (e.g., needle and gauge) or a digital number representation.

Figure 11:
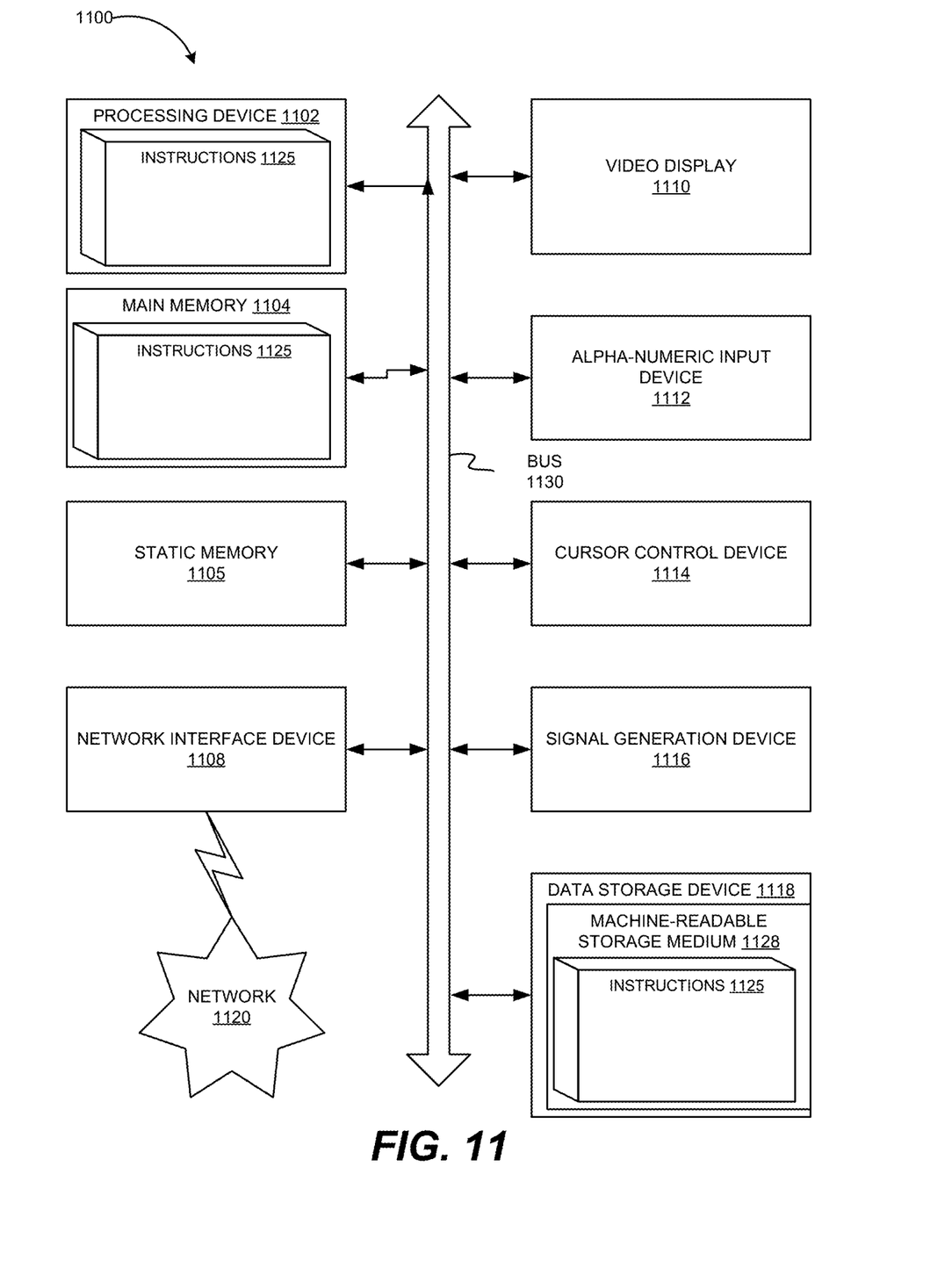
FIG. 11 is a block diagram of an example apparatus that may perform one or more of the operations described herein, in accordance with some embodiments of the present disclosure.

FIG. 11 is a block diagram of an example computing device 1100 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a static memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also comprise one or more special-purpose processing devices such as an application specific integrated circuit (ASIC), a field programmable gate array (FPGA), a digital signal processor (DSP), network processor, or the like. The processing device 1102 may be configured to execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus comprising:
   a location and motion tracking device;
   a memory; and
   a processing device coupled to the memory, the processing device to:
   receive, from a mobile device, a configuration for a race between a plurality of users, wherein the mobile device is operatively coupled to the location and motion tracking device;
   link to a location and motion tracking device associated with each of the plurality of users;
   in response to a start of the race, track, via the location and motion tracking device, a location of the apparatus and a relative location of each of the devices associated with the plurality of users, wherein the relative locations of each of the devices associated with the plurality of users are tracked concurrently based on the link between the location and motion tracking devices associated with each of the plurality of users; and
   display, via a graphical user interface of the mobile device, the location of the apparatus and the relative locations of each of the devices associated with the plurality of users.

2. The apparatus of claim 1, wherein the processing device is further to:

provide an alignment of the apparatus and the location and motion tracking devices of the one or more users with respect to a starting position indicated by the configuration for the race.

3. The apparatus of claim 1, wherein the processing device is further to:
determine an outcome of the race based on the configuration for the race, the location of the apparatus, and the relative location of the location and motion tracking devices associated with the one or more users.

4. The apparatus of claim 1, wherein the processing device is further to:
provide race statistics to the mobile device or a web server.

5. The apparatus of claim 1, further comprising:
at least one light emitting diode (LED) or speaker, wherein the processing device is to provide an indication of the start of the race via the at least one LED or speaker.

6. The apparatus of claim 1, further comprising:
a peer to peer communication device to link the apparatus with the devices of the one or more users.

7. The apparatus of claim 1, wherein the processing device is to:
provide an indication of the relative position of the apparatus and the location and motion tracking devices of the one or more users to be displayed on the mobile device.

8. A method of race tracking, comprising:
configuring, by a processing device, a race based on input from a user;
initiating the race with a plurality of participants;
connecting location and motion tracking devices associated with each participant of the plurality of participants; and
receiving race data from the location and motion tracking devices associated with the plurality of participants, wherein the race data comprises a location and relative location of each location and motion tracking device associated with the plurality of participants concurrently collected during the race; and
displaying, via a user interface of a computing device, an indication of the location and relative location of each location and motion tracking device.

9. The method of claim 8, further comprising:
determining results of the race based on a configuration of the race and the race data from the location and motion tracking devices.

10. The method of claim 8, further comprising:
providing the configuration of the race to a web server to be stored in a database.

11. The method of claim 10, further comprising:
providing the race data to the web server to be stored in the database associated with the plurality of participants and the configuration of the race.

12. The method of claim 8, wherein the race data comprises at least one of a location of the location and motion tracking devices with respect to a race layout, a relative position of each of the plurality of location and motion tracking devices in the race with respect to the race layout, a speed of the plurality of location and motion tracking devices, timing of the race, and an amount of the race remaining.

13. The method of claim 8, wherein configuring the race comprises:
moving at least one of the location and motion tracking devices along the intended race layout; and
recording the race layout as the at least one location and motion tracking device travels along the intended race layout.

14. The method of claim 8, wherein providing the indication of the race data comprises:
displaying at least a relative position of each of the plurality of location and motion tracking devices with respect to the configuration of the race.

15. A system comprising:
a plurality of location and motion tracking devices to track a location and relative position of one or more race participants concurrently during a race, wherein the plurality of location and motion tracking devices are communicatively linked;
a plurality of mobile devices, wherein each of the plurality of mobile devices is associated with one of the location and motion tracking devices and communicates directly with the associated location and motion tracking device;
a web server to receive race data recorded by the plurality of location and motion tracking devices, wherein the race data comprises the location and relative position of the one or more race participants, and wherein the race data is displayed, via a graphical user interface of one or more client computing devices accessing the race data.

16. The system of claim 15, wherein each of the plurality of tracking devices comprise:
a global position system (GPS) device, an accelerometer, and a proximity sensor.

17. The system of claim 15, wherein the web server provides the race data to a client device upon request from the client device.

18. The system of claim 15, wherein each of the plurality of mobile devices display, via a graphical user interface, an indication of the race data.

19. The system of claim 15, wherein the race data comprises at least one of a location of the location and motion tracking devices with respect to a race layout, a relative position of each of the plurality of location and motion devices in the race with respect to the race layout, a speed of the plurality of location and motion devices, timing of the race, and an amount of the race remaining.

20. The system of claim 15, wherein the web servers stores a race configuration, the race data, and the race participants in a race database.

* * * * *